United States Patent
Doerrie et al.

(10) Patent No.: US 6,230,555 B1
(45) Date of Patent: May 15, 2001

(54) MEASURING DEVICE FOR MEASURING THE BRAKING MOMENT IN A MOTOR VEHICLE

(75) Inventors: Dieter Doerrie, Stuttgart; Andreas Soens, Deizisau, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 08/985,957

(22) Filed: Dec. 5, 1997

(30) Foreign Application Priority Data

Dec. 5, 1996 (DE) .............................................. 196 50 477

(51) Int. Cl.[7] ....................................................... G01L 5/16
(52) U.S. Cl. ................................................. 73/129; 33/609
(58) Field of Search ............................ 73/121, 128, 129, 73/130; 33/335, 337, 501, 193, 203, 203.18, 600, 609, 610

(56) References Cited

U.S. PATENT DOCUMENTS

| | | |
|---|---|---|
| 3,298,223 | 1/1967 | Dyer, Jr. . |
| 3,794,143 | * 2/1974 | Leiber et al. . |
| 3,867,838 | * 2/1975 | Gerresheim ............................. 73/146 |
| 4,297,877 | * 11/1981 | Stahl ......................................... 73/146 |
| 4,836,034 | * 6/1989 | Izumi et al. ........................ 73/862.04 |
| 4,849,730 | * 7/1989 | Izumi et al. . |
| 5,540,108 | * 7/1996 | Cook et al. ....................... 73/862.041 |
| 5,894,094 | * 4/1999 | Kuchler et al. ......................... 73/146 |

FOREIGN PATENT DOCUMENTS

| | | |
|---|---|---|
| 2 104 003 | 7/1973 | (DE) . |
| 2 302 540 | 7/1974 | (DE) . |
| 27 08 484 C2 | 7/1983 | (DE) . |
| 37 15 472 A1 | 11/1987 | (DE) . |
| 37 15 472 C2 | 11/1989 | (DE) . |
| 93 01 111 | 7/1994 | (DE) . |
| 0 575 634 A1 | 12/1993 | (EP) . |
| 2 039 063 | 7/1980 | (GB) . |

* cited by examiner

Primary Examiner—Eric S. McCall
(74) Attorney, Agent, or Firm—Evenson, McKeown, Edwards & Lenahan, P.L.L.C.

(57) ABSTRACT

A device for measuring the braking moment in a motor vehicle with disk brakes incorporates a measuring hub mounted on a wheel axle and connected with a wheel rim. Viewed in the radial direction, the hub is divided into an inner part close to the axle and an outer part that forms the marginal area of the measuring hub and surrounds the inner part concentrically. These two sections are connected to one another by ribs which extend radially, with sensors mounted thereon for measuring the bending stress acting on the ribs as a result of the introduction of a torque. In order to determine the braking moments acting on the disk brake without superimposition of other moments acting on the vehicle wheel, the brake disk of a braking device of the motor vehicle surrounds the outer part of the hub concentrically, and is fastened only to the outer part.

16 Claims, 2 Drawing Sheets

MEASURING DEVICE FOR MEASURING THE BRAKING MOMENT IN A MOTOR VEHICLE

BACKGROUND AND SUMMARY OF THE INVENTION

This application claims the priority of German patent document 196 50 477.5, the disclosure of which is expressly incorporated by reference herein.

The invention relates to a device for measuring the braking moment in a motor vehicle.

A measuring device of this generic type, disclosed in British Patent Document GB 2 039 063 A1, incorporates a two-part measuring hub, with both parts being designed as annular discs. The first part consists of an inner section located coaxially to the wheel axis and near the axle, and releasably connected with a motor vehicle wheel rim by a screw connection. The outer section, located concentrically with respect to the inner section and spaced radially therefrom, forms the marginal area of the measuring hub and is integrally connected therewith by ribs in the form of spokes extending radially. Measuring strips that detect expansion stresses are fastened to the ribs, with the forces acting on the wheel in the circumferential direction being measured by the strips on the basis of the shear stress developed in the ribs. The outer annular section also has protrusions extending radially inward between the ribs, the ends of which protrusions each form a gap with the inner section, extending in the circumferential direction.

The second part has four projections which extend perpendicularly edgewise from the disc plane, and are offset from one another in the circumferential direction by an angle of approximately 90°. With the measuring hub in the assembled state, the projections pass axially from the inside to the outside through the gaps and are welded to the protrusions. The projections are designed so that they delimit a very narrow gap with the inner section of the first part in the operating position of the second part, so that when a given maximum twisting of the measuring hub spokes in the circumferential direction, (determined by the width of the gap) is exceeded during measurement by the force moments acting at this point, overload protection is provided by the arrangement of the spokes at the protrusions and/or the projections of the second part. The second part is bolted to an adapter, which in turn then is bolted in the direction of the motor vehicle body adjacent to a disk of a disk brake connected to the wheel hub. The brake is mounted on the wheel axle coaxially to the measuring hub.

This measuring hub is used to measure torques and is mounted between the rim and the hub so that it detects all possible torques acting on the wheel, and a total torque is recorded, including for example, frictional moments from the axle bearing and the transmission, braking moments from the disk brake, as well as the wheel load and the lateral forces on the wheel. However it is impossible to detect, in a sensitive and selective fashion, only the resultant forces that act on the brake disk as a braking moment. It is also not possible to design these measuring hubs for very small braking moments since the measuring hubs must have sufficient strength, especially at the measurement points, to be able to withstand the wheel loads and lateral forces when driving. Conventional measuring hubs are therefore completely insensitive to small braking moments.

A measuring hub disclosed in German patent document DE-OS 2 302 540 has ribs provided with expansion-measuring strips and fastened endwise to a brake drum at one end and to a vehicle wheel at the other by screw connections, with no individual adaptation of the measuring hub to the object to be measured being required apart from the geometric arrangement of the through holes for the connecting screws.

A system for torque measurement in motor vehicles is disclosed in German patent document DE 93 01 111.3 U1, in which a brake disk is mounted on a vehicle hub. A measuring hub with a flange projecting radially inward is screwed to the disk by means of an adapter. Another adapter is screwed to the measuring hub in its circumferential area, with a test wheel being fastened to the adapter by screw connections. This makes it possible to obtain test results on vehicles that can be transferred to similar vehicles with wheels mounted directly on the vehicle hubs.

In addition, in a torque-measuring system disclosed in German patent document DE 27 08 484 C2, influencing of the torque-measuring result by significantly fluctuating axial or radial loads on the torque-measuring device is prevented. For this purpose a torque-measuring disk is fastened by screw connections to a wheel flange that can be braked and is connected with the wheel hub. The flange has a section which is located radially inward and is separated by a hole circle from the outward area of the measuring disk. The holes, located close together on a circular line, are separated from one another by narrow ribs, to which ribs expansion measurement strips are glued laterally, in other words in the walls of the holes, at the points of maximum bending stress. The ribs connect the inner section with the outer section of the measuring disk. The outer section in turn is mounted to a wheel hub by screw connections. Since tensile or compressive stresses induced by horizontal and vertical radial forces make themselves felt at points on the ribs other than those to which the expansion-measuring strips have been applied, these measurement-distorting forces are screened out, so to speak, during measurement. At the same time, axial forces act on the rib formation only to a negligible degree. Thus, deformations of the measurement ribs that are caused exclusively by torque are recorded.

In addition, a measuring hub for measuring forces and/or moments acting axially and/or radially on a vehicle wheel disclosed in German patent document DE-AS 2 104 003. The hub is flanged in place of the wheel bearing to the vehicle axle, fixed in the rotational direction. By means of bearings located inside the measuring hub, the hub rotatably supports the vehicle wheel. The braking and traction moments thus cannot be determined selectively. The measuring hub has three different circles of measuring ribs in the form of a spoked wheel. These ribs are located axially at different positions relative to the central plane of the wheel in part differently with respect to the rotational axis. Expansion-measuring strips are mounted on the spokes for measuring the tensile and/or compressive forces in the area of the smallest bending moments.

A device for measuring forces and moments acting on vehicle tires can be found in German patent document DE 37 15 472 C2, in which a measuring disk is mounted endwise by screws to an inwardly located section (hub part) on an axle flange of a wheel axle. An outer section (rim section) containing the marginal area of the measuring disk is connected with the hub part by narrow ribs to which expansion-measuring strips are glued. The ribs are formed by U-shaped slots machined into the disk in a circular arrangement at 90° intervals from one another and by U-shaped slots in the disk that are offset by an angle from the first slots and are spaced 90° apart from one another, the latter slots being in the shape of an inverted U. The rim part is bolted to a wheel rim.

A torque-measuring disk disclosed in U.S. Pat. No. 3,298,223 is mounted to a wheel rim by an outer section, and to a wheel hub by an inner section. In addition, a brake disk of a braking device of a motor vehicle is fastened by bolts separately to the wheel hub. A sensor for detecting the acting tensile and/or compressive forces is fastened between the outer section of the measuring disk and a torque lever flanged directly to the wheel hub.

Finally, a torque sensor disclosed in European patent document EP 0 575 634 A1, consists of two coaxial circular ring flanges which are arranged sequentially and parallel to one another and connected together by a plurality of axial ribs. Expansion-measuring strips are mounted on the ribs, by which strips the bending expansion of the rib caused by the applied torque is determined. In another embodiment, the sensor is designed as a spoked wheel, with the expansion-measuring strips mounted on the insides of the spokes. In a third embodiment sections in the form of circle segments project radially from the wheel hub into the spaces between the spokes. These sections provide overload protection when the expansion load limit of the spokes is reached.

The goal of the present invention is to provide an improved measuring device of the type described above, in which braking moments acting on the disk brake can be determined separately from other moments acting on the motor vehicle wheel, in a simple fashion and without any overlap.

This and other objects and advantages are achieved by the measuring apparatus according to the invention, which incorporates a measuring hub mounted on a wheel axle and connected with a wheel rim. Viewed in the radial direction, the hub is divided into an inner part close to the axle and an outer part that forms the marginal area of the measuring hub and surrounds the inner part concentrically. These two sections are connected to one another by ribs which extend radially, with sensors mounted thereon for measuring the bending stress acting on the ribs as a result of the introduction of a torque. In order to determine the braking moments acting on the disk brake without superimposition of other moments acting on the vehicle wheel, the brake disk of a braking device of the motor vehicle surrounds the outer part of the hub concentrically, and is fastened only to the outer part of the hub.

Thanks to the invention, only the braking moments that result from the braking device (those resulting from the interaction of the brake caliper and the brake disk) act on the ribs connecting the two sections of the measuring hub. Because of the arrangement of the brake disk and of the outer section, being separated by the ribs and completely decoupled from the inner part (and hence from the wheel axle), these braking moments can be detected simply by the sensors applied to the ribs, without superimposition of other torques caused by bearings and by the transmission which otherwise would distort the measurement results. Such torques are essentially screened out by the sole connection of the brake disk to the outer section of the hub.

Because the braking torques are detected without distortion, both small braking moments as well as large braking moments that result for example from a full brake application can be detected equally well. Moreover, by virtue of the optimally short power flow path isolated from other influences, it is especially suitable for measuring very small braking moments with great sensitivity, for example the frictional moments that result from the action of the brake caliper on the brake disc when the brake is not being applied. This residual friction of the brakes, which results from a non-uniform thickness distribution and/or a stick-slip effect of the brake disk on the brake caliper, causes constant and considerable power losses and should therefore be as low as possible. By measuring the residual friction (in other words, by detecting the small braking moment), a rapid and reliable evaluation can be made as to whether design changes in the braking device will achieve the desired result, namely reducing residual frictional moments.

In the measuring hub according to the invention, due to the arrangement of the brake disk on the measuring hub, the only torque which affects the ribs (containing the measurement points between the part) are the braking torques that result from the interaction of the brake disk with the brake caliper. Therefore, the ribs can be designed with a strength that needs only withstand the braking torques. Because of the lower demands on the strength of the measurement points, the ribs can be designed with a smaller thickness and/or greater length than conventionally, so that they are very flexible by comparison, considerably increasing measurement sensitivity.

On the other hand, measurement with conventional measuring hubs is possible only with considerable inaccuracy, since the measuring hubs must withstand all of the forces and moments acting on the wheel. This leads to compromise solutions in designing measuring hubs because of the high strength requirements, being made very sturdy at the measurement points as well, which is disadvantageous for measurement sensitivity, especially when measuring small moments.

Other objects, advantages and novel features of the present invention will become apparent from the following detailed description of the invention when considered in conjunction with the accompanying drawings.

DETAILED DESCRIPTION OF THE DRAWINGS

Figure 1:
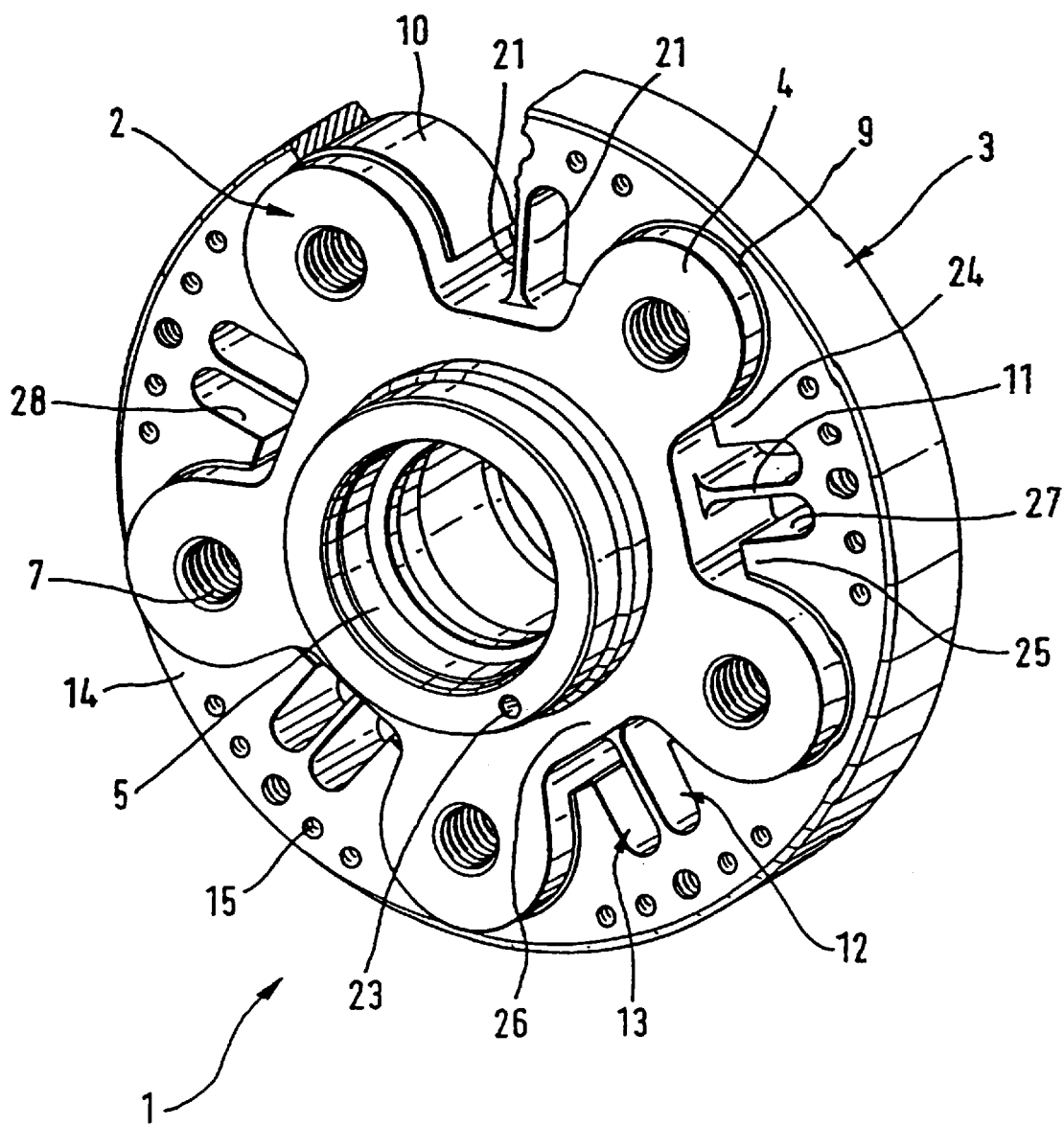
FIG. 1 is a perspective view of a measuring hub of the measuring device according to the invention.

FIG. 1 shows a disk-shaped measuring hub 1 of a measuring device for measuring the braking moment in a motor vehicle with disk brakes. Measuring hub 1 consists of two parts, an inner part 2 (relative to the radial direction), and an outer part 3 that forms the marginal area of measuring hub 1 and surrounds inner part 2 concentrically.

Inner part 2 is substantially star shaped in its design, with the five "points" 4 being made in the form of circular segments and offset symmetrically by 72° with respect to one another in the circumferential direction of the star. At its center, inner part 2 has a passageway 5 by which it can be mounted on a wheel axle 6. In addition, its points 4 have mounting threads 7 passing through them centrally for mounting a wheel hub 8 of a motor vehicle hub by screwing, with these threads 7 simply being located at the usual places for mounting the wheel on a wheel hub.

The outer part 3 surrounds the inner part 2, and has a circular outer peripheral contour and an inner contour that is complementary to the outer circumference of the inner part 2. The two parts 2 and 3 are spaced apart from one another by a circumferential gap 9 that has a uniform width which is measured in the millimeter range—preferably 1 mm wide.

A spacer 10 which is located in gap 9, in the vicinity of points 4 of star-shaped inner part 2, spacer defines gap 9 at this point by reducing it to a width in the vicinity of 0.05 mm. Spacer 10 is mounted like a clamp on the respective points 4 of star-shaped part 2. In the present embodiment, spacer 10 is designed as a slotted bushing to match circular-segment-shaped points 4, and is mounted on the respective points 4 so that it surrounds them concentrically. The inside diameter of the bushing is smaller than the outside diameter of point 4 so that it effectively clamps on point 4. The bushing is thus fastened to inner part 2 in a simple and weight-saving manner without fastening elements such as screws, bolts, or the like being required.

Figure 2:
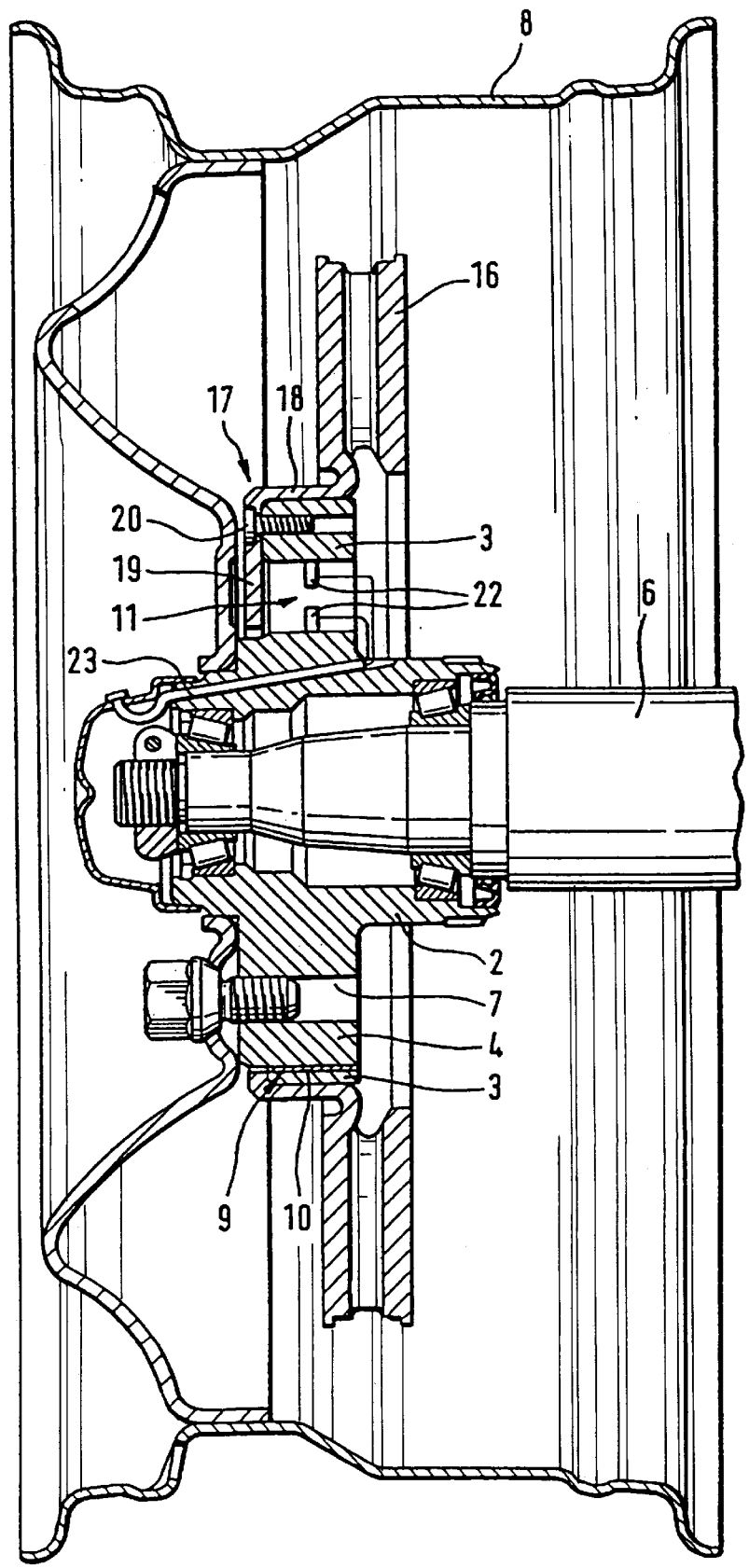
FIG. 2 is a lateral lengthwise section of the measuring hub in FIG. 1 in the assembled state with a vehicle wheel.

Inner part 2, in the vicinity of its points 4 (and hence of its mounting thread 7), engages outer part 3 in such fashion that the two parts 2, 3 can twist with respect to one another only slightly in the circumferential direction, until they touch one another, preventing further twisting. The two parts 2 and 3 are connected together between points 4, by a central radially disposed rib 11. This rib is formed by a thin partition that separates two similarly shaped machined recesses 12, 13, which extend radially outward from the inner circumference of outer part 3 and continuously in the width direction of measuring hub 1 in part 3. The outer part 3 is fastened to a brake disk 16, as shown in FIG. 2, by several threaded bores 15 which are arranged in a row in the circumferential direction, at its end 14, between points 4. In order to bolt brake disk 16 at this location, it is necessary to machine brake disk 16 accordingly.

Brake disk 16 of the braking device of the motor vehicle surrounds outer part 3 coaxially and has mounting flanges 17 at its inner circumference. These flanges are connected directly with the inner circumference by a first section 18 which extends axially, and by a second section 19 that abuts first section 18 and is bent radially inward at right angles, fitting around end 14 of outer part 3, in each case between points 4 of inner part 2. Sections 19 are each releasably connected with outer part 3 by bolts 20 screwed into threaded bores 15. Brake disk 16 is located with zero contact relative to wheel axle 6, being fastened only at outer part 3.

As shown in FIG. 2, on walls 21 of ribs 11, pointing in the circumferential direction of measuring hub 1, sensors 22 in the form of expansion-measuring strips (EMS) are attached, preferably by gluing, and are connected together to form a full bridge. By means of this bridge, the bending stress that results from the introduction of a braking moment into ribs 11 can be measured, from which the magnitude of the instantaneous braking moment can be detected.

Inner part 2, outside the inside diameter of its passageway 5, has at least one through channel 23, representing several, that runs diagonally and axially. Through this channel a measuring cable can be guided, which connects sensors 22 with an electronic device for processing and evaluating signals.

Measuring hub 1 can also be mounted on wheel axle 6 (as opposed to the hub) that can form the drive shaft of the motor vehicle. This arrangement has the disadvantage that as a result of the additional mounting of a measuring hub 1 on the wheel hub, the wheel masses that are unsprung relative to the vertical oscillating movements of the wheels during driving are increased and the mass distribution of the wheels may be changed. As a result, systematic measurement errors develop, and because of the differences in masses and the differences in mass distribution, the measurement results obtained cannot simply be related to actual driving without a measuring device. This limits the exact evaluation of the signal results for measurements on the braking device that must be corrected later. To avoid these disadvantages, in a simple yet highly advantageous manner, measuring hub 1 itself is designed as a wheel hub and is provided as a replacement for said hub with inner part 2 on wheel axle 6, omitting the usual wheel hub.

Ribs 11 are designed to be flexible, thereby ensuring increased sensitivity of the measuring device that includes measuring hub 1, sensors 22, and brake disk 16 and a device for evaluating the sensor signals. If a braking moment is introduced into brake disk 16 by the brake caliper (not shown), the outer part 3 twists relative to inner part 2, and the ribs are bent in the shape of an "S" until the inner part 2 externally abuts the vicinity of points 4. Twisting is then possible only to the extent that the contact surfaces of parts 2, 3 that are in contact with one another in this area, yield.

The EMS full bridge mounted on ribs 11 (FIG. 2) has a high sensitivity at small moments until contact is made. After contact is made, a further increase in torque produces only a slight increase in the output signal of the EMS bridge. The sensitivity of measuring hub 1 then decreases sharply. However, it is nevertheless still possible to evaluate the high torque measurement range. In this measurement range, a linear relationship is likewise provided between the torque and the output signal.

The permissible deformation of ribs 11 amounts to only a few hundredths of a millimeter. To reduce gap 9, the slotted bushing is mounted in the vicinity of points 4 so that the remaining gap is changed to a smaller size. For simple compensation of part tolerances, bushings with different wall thicknesses can be used. By using spacers 10, it is possible, by forming a gap 9 that is initially unnecessarily wide, to make the contours of the outer circumference of inner part 2 and the inner circumference of outer part 3 as well as those of ribs 11 by means of a simple manufacturing technique, such as by wire erosion with an erosion section. The spacers 10 reduce gap 9 at the point where it must be reduced accordingly, namely in the vicinity of points 4, to ensure sufficient overload protection. This meets the requirements for measuring hub 1, first to respond in a sensitive manner to small braking moments, and second, during brake application, to be able to withstand a moment several times its measurement range without being damaged.

In order to offer a sufficient contact surface, and hence sufficient overload protection, outer part 3 fits around two legs 24, 25, which have corresponding wall thickness in the width and circumferential directions of measuring hub 1, and extend close to annular part 26 of inner part 2 that supports points 4, with legs 24, 25 being delimited by side walls 27, 28 of recesses 12, 13. Since the wheel forces attack only the inner part 2 of measuring hub 1 and do not travel through ribs 11, it is possible to make the ribs sufficiently flexible (in other words thin and long) that very small braking moments can be measured.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Measuring device for measuring braking moment in disk brakes of a motor vehicle, said measuring device having a measuring hub adapted to be fastened to a wheel axle and to be connected with a wheel rim, said hub being divided into a radially inner part, and a radially outer part that forms a marginal area of the measuring hub and surrounds the inner part concentrically, said inner and outer parts being connected with one another by radially extending ribs on which sensors are mounted for measuring bending stress acting as a result of the introduction of a braking moment into the ribs, wherein:

in an installed state of said hub, the outer part of measuring hub is located coaxially with a brake disk of said disk brakes;

in an installed state of said hub, the brake disk is fastened solely to said hub and is coupled to said axle only via said ribs; and the inner part of the hub is adapted to be fastened to wheel rim.

2. Measuring device according to claim 1 wherein the measuring hub comprises a wheel hub and is provided as a replacement for an existing wheel hub with the inner part on the wheel axle.

3. Measuring device according to claim 2 wherein the inner part of measuring hub has a mounting thread for mounting a motor vehicle wheel.

4. Measuring device according to claim 1 wherein:

the inner part has an outer contour which includes a plurality of peripherally spaced radially outwardly extending projections; and the outer part has an inner contour which conforms to the outer contour of the inner part; and the outer part is spaced from the inner part by a circumferential gap which is interrupted by the ribs.

5. Measuring device according to claim 4 wherein a width of the gap in the vicinity of outer ends of the projections is approximately one millimeter, and is at least equal to a width of said gap at points on a remainder of the outer circumference of the inner part.

6. Measuring device according to claim 4 wherein a rib is located centrally between each of the projections, said rib being formed by a radially extending partition that divides two similarly shaped recesses in the outer part and extends in the width direction of measuring hub.

7. Measuring device according to claim 4 wherein outer ends of the projections are made in the shape of circular segments.

8. Measuring device according to claim 4 further comprising a spacer placed in the gap in the vicinity of outer ends of the respective projections, said spacer reducing an effective width of the gap to approximately 0.05 mm.

9. Measuring device according to claim 8 wherein the spacer is clamped on respective outer ends of the projections.

10. Measuring device according to claim 8 wherein:

the outer ends of the projections are circular segment-shaped;

the spacer is a slotted bushing placed on the respective outer ends of the projections and surrounds them concentrically; and an inside diameter of said bushing is smaller than an outside diameter of the outer ends of the projections.

11. Measuring device according to claim 1 wherein contours of an outer circumference of the inner part, of an inner circumference of the outer part, and of the ribs are formed by wire erosion.

12. Measuring device according to claim 1 wherein the ribs are flexible.

13. A measuring hub for measuring braking moments exerted by disk brakes of a motor vehicle, said measuring hub comprising:

a radially inner part which is adapted to be mounted to an axle of said motor vehicle in a rotationally fixed manner;

a radially outer part which includes a fixed mounting for a brake disk of said disk brakes, which brake disk is mounted exclusively to, and disposed concentrically outward from said radially outer part;

a plurality of radially extending ribs connecting said radially inner and outer parts; and a plurality of sensors mounted on said ribs, for measuring bending stress due to a braking moment exerted by said brake disk.

14. A measuring hub for measuring braking moments according to claim 13 wherein said inner part is also mounted directly to a wheel rim of said vehicle.

15. Measuring device according to claim 13 wherein:

the inner part has an outer contour which includes a plurality of peripherally spaced, radially outwardly extending projections; and the outer part has an inner contour which conforms to the outer contour of the inner part; and the outer part is spaced from the inner part by a circumferential gap which is interrupted by the ribs.

16. Measuring device according to claim 15 wherein a rib is located centrally between each of the projections, said rib being formed by a radially extending partition that divides two similarly shaped recesses in the outer part, and extends in the width direction of the measuring hub.

* * * * *